(12) United States Patent
Van Boxtel (10) Patent No.: US 9,840,134 B2
(45) Date of Patent: Dec. 12, 2017

(54) SUNSHADE ASSEMBLY AND OPEN ROOF CONSTRUCTION PROVIDED THEREWITH

(71) Applicant: Inalfa Roof Systems Group B.V., Oostrum (NL)

(72) Inventor: Eduardus Christianus Henricus Van Boxtel, Zeeland (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 15/057,716

(22) Filed: Mar. 1, 2016

(65) Prior Publication Data

US 2016/0257184 A1 Sep. 8, 2016

(30) Foreign Application Priority Data

Mar. 4, 2015 (EP) ..................................... 15157573

(51) Int. Cl.
*B60J 7/00* (2006.01)
*B60J 10/35* (2016.01)
*B60J 1/20* (2006.01)

(52) U.S. Cl.
CPC ............. *B60J 7/0015* (2013.01); *B60J 10/35* (2016.02); *B60J 1/2052* (2013.01)

(58) Field of Classification Search
CPC ......... B60J 10/35; B60J 7/0015; B60J 1/2052
See application file for complete search history.

(56) References Cited

U.S. PATENT DOCUMENTS 1,370,500 A 3/1921 Jones
1,459,155 A 6/1923 Ioor
(Continued)

FOREIGN PATENT DOCUMENTS

CN 2700152 Y 5/2005
CN 1721216 A 1/2006
(Continued)

OTHER PUBLICATIONS

European Search Report and Written Opinion for European patent application No. 15157573, dated Sep. 2, 2015.
(Continued)

*Primary Examiner* — D Glenn Dayoan
*Assistant Examiner* — Melissa A Black
(74) *Attorney, Agent, or Firm* — Steven M. Koehler; Westman, Champlin & Koehler, P.A.

(57) ABSTRACT

A sunshade assembly for use in a vehicle roof assembly comprises a flexible sunscreen having at least a central part and two opposed inwardly folded longitudinal edges connected to the central part by means of folding lines. A winding shaft for winding and unwinding the flexible sunscreen is provided at the trailing edge and an operating beam at the leading edge of the sunscreen. Two opposed longitudinal guides retain therein and guide corresponding ones of the folded longitudinal edges of the sunscreen. The guides are provided with locking members for engaging an outer end of the inwardly folded longitudinal edges for preventing these edges from moving out of the longitudinal guides when the sunscreen is at least partly unwound. The sunscreen includes at least two members which are each arranged substantially parallel to a respective longitudinal edge and which are buckle-stiff in a direction parallel to said longitudinal edge.

20 Claims, 5 Drawing Sheets

(56) References Cited

U.S. PATENT DOCUMENTS

| | | |
|---|---|---|
| 1,673,326 A | 6/1928 | Goldsmith |
| 3,017,927 A | 1/1962 | Demko |
| 4,649,981 A | 3/1987 | Bibeau |
| 4,825,921 A | 5/1989 | Rigter |
| 5,117,892 A | 6/1992 | Murray |
| 5,934,353 A | 8/1999 | Buhr |
| 6,179,373 B1 | 1/2001 | Bohm |
| 6,394,173 B2 | 5/2002 | Enssle |
| 6,942,003 B2 | 9/2005 | Thompson |
| 7,114,766 B2 | 10/2006 | Becher |
| 7,114,767 B2 | 10/2006 | Grimm |
| 7,793,702 B2 | 9/2010 | Biewer |
| 7,971,626 B2 | 7/2011 | Benz |
| 9,090,147 B2 | 7/2015 | Nellen |
| 2005/0225122 A1 | 10/2005 | Grimm |
| 2005/0225123 A1 | 10/2005 | Grimm |
| 2006/0027347 A1 | 2/2006 | Boehm |
| 2007/0175603 A1 | 2/2007 | Lin |
| 2008/0179021 A1 | 7/2008 | Biewer |
| 2009/0145559 A1 | 6/2009 | Glasl |
| 2009/0178771 A1 | 7/2009 | Lin |
| 2011/0146921 A1 | 6/2011 | Nellen |
| 2011/0227371 A1 | 9/2011 | Nellen |

FOREIGN PATENT DOCUMENTS

| | | | |
|---|---|---|---|
| DE | 102004028882 | 1/2006 | |
| DE | 202006015107 | 1/2007 | |
| EP | 1588880 | 10/2005 | |
| EP | 1616737 | 1/2006 | |
| EP | 1953018 | 8/2008 | |
| FR | 1378077 | 11/1964 | |
| WO | 2006053520 | 5/2006 | |
| WO | WO 2009026904 A1 * | 3/2009 | ............ B60J 7/0015 |
| WO | 2010022769 | 3/2010 | |
| WO | 2010063312 A1 | 6/2010 | |

OTHER PUBLICATIONS

Copy of European Search Report and Written Opinion for European patent application No. 15157573, dated Sep. 2, 2015.

* cited by examiner

Fig. 6

SUNSHADE ASSEMBLY AND OPEN ROOF CONSTRUCTION PROVIDED THEREWITH

BACKGROUND

The discussion below is merely provided for general background information and is not intended to be used as an aid in determining the scope of the claimed subject matter.

Such sunshade assemblies are known in wide number of varieties. The sunscreens are tensioned in lateral direction in order to provide a sleek appearance to the people in the vehicle. The lateral edges of the sunscreen retain the edges of the sunscreen within the guides so that the sunscreen remain stretched. A spring within the winding roller ensures a reliable winding up, i.e. opening of the sunscreen, while the closing of the sunscreen is effected by moving the operating beam, either by hand or by the motorized drive. Due to the increase in size of the sunscreen and the increased sliding forces in the guides, the spring should be made stronger as well. This is a problem as the space within the winding roller is limited. Enlarging the roller would decrease the headroom within the vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

A sunshade assembly, in particular for use in a vehicle roof assembly, includes a flexible sunscreen having at least a central part, two opposed inwardly folded longitudinal edges connected to the central part by means of folding lines, a leading edge and a trailing edge. A winding shaft is joined the sunscreen at its trailing edge for winding and unwinding the flexible sunscreen, while an operating beam is attached to the leading edge. Two opposed longitudinal guides for retaining therein and guiding corresponding ones of the inwardly folded longitudinal edges of the flexible sunscreen. The guides are provided with locking members for engaging an outer end of the inwardly folded longitudinal edges for preventing these edges from moving out of the longitudinal guides when the sunscreen is at least partly unwound. The flexible sunscreen is provided with at least two members which are each arranged substantially parallel to a respective longitudinal edge of said sunscreen and which are buckle-stiff in a direction parallel to said longitudinal edge. The buckle-stiff members extend at least partly within and preferably are guided by said longitudinal guides along the whole length from the operating beam to the winding shaft in the fully unwound condition of the sunscreen.

Due to the buckle-stiff members, it is possible for the operating beam to push the sunscreen in order to be wound-up. The pushability of the members avoids wrinkling of the sunscreen as the members will remain stable and take the sunscreen along while being taut laterally and longitudinally. As the sunscreen can be pushed by the operating beam, the pulling force of the spring in the winding roller can be reduced so that a small spring in the winding roller might be sufficient. Lower forces will also result in a more constant operating speed.

The spring in the winding roller can even further reduced or even left out if the members are biased towards a spiral shape. Alternatively or additionally, a smaller motor may be used for driving the operating beam which will result in a lower noise level.

In one embodiment, the buckle-stiff members each comprise at least one buckle-stiff wire which may be provided at the inwardly foldable longitudinal edges. For example, the inwardly foldable longitudinal edges each comprise two integrated, substantially parallel wires.

In another embodiment, the buckle-stiff members are strips provided in the central part of the sunscreen.

In one embodiment, the strips are made of metal, in particular steel, which may have a thickness of ca. 002-0.15 mm.

Due to the small thickness of the steel strips, they will not cause problems with winding up the sunscreen. Generally, the strips will have a larger thickness when they are biased to a spiral shape. This will not hinder winding up the sunscreen as the strips will then promote winding due to their tendency to coil to their spiral shape.

In an embodiment, the central part of the sunscreen is made of cloth like material or material having similar properties, the strip may be positioned next to an edge of the cloth-like material and attached to the cloth-like material by means of a connecting member which may cover at least one side of the strip and an adjacent portion of the cloth-like material. The connecting member may be tape or woven or non-woven cloth and may be attached for example glued, welded or stitched to the material of the central part of the sunscreen.

The connecting member, such as the tape, may cover both sides of the strip, the inwardly foldable longitudinal edge and the adjacent portion of the cloth-like material in order to form a integrally bonded unit. A reinforcement, for example in the form of a strip e.g. from plastic, steel or the like, may be provided within the inwardly foldable edge, in particularly within said tape.

Alternatively, each strip is attached on a side of the central part of the sunscreen. This will lead to a more stable structure needing less lateral space, but this will cause an increased roll-up thickness.

In one embodiment, each strip is guided by the respective guide so as to reduce the buckle tendency of the members. Each guide may be shaped such that each strip is able to contact the guide at least at two separated positions, one above and one below the strip. In case each guide is shaped such that each strip is able to contact the guide at three separated positions, two are on one side and one is on the other. Each strip is then carefully guided.

BRIEF DESCRIPTION OF THE DRAWINGS

Aspects of the invention will be elucidated while referring to the drawings, in which.

DETAILED DESCRIPTION OF THE ILLUSTRATIVE EMBODIMENTS

Figure 1:
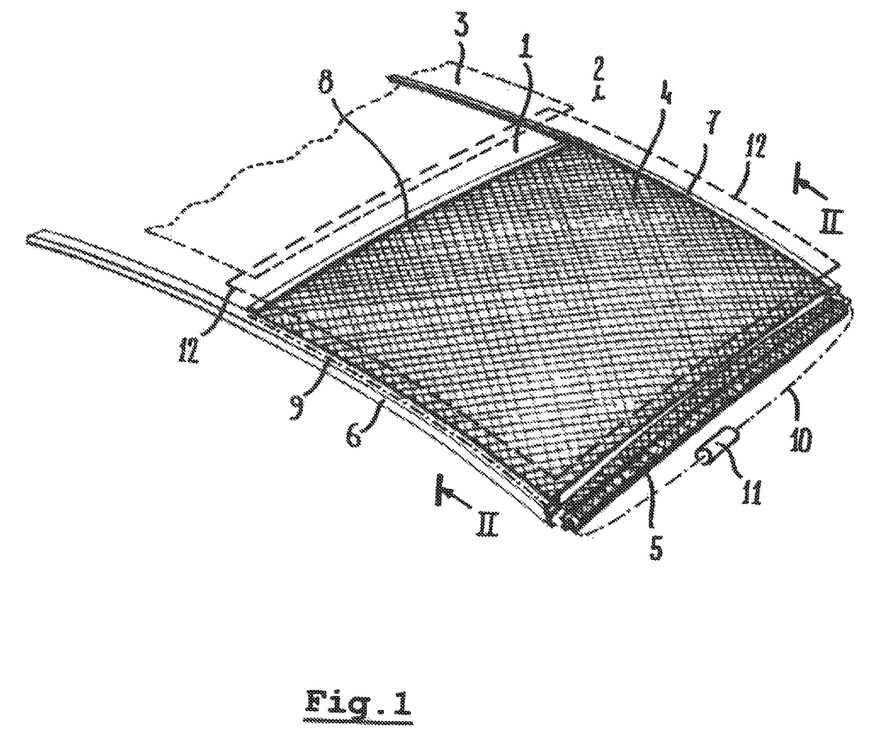
FIG. 1 shows, schematically and in a perspective view, a sunshade assembly applied to an open roof construction.

Firstly referring to FIG. 1, an example is illustrated of an open roof construction for a vehicle, such as a passenger car, having a roof assembly and comprising a sunscreen assembly in accordance with aspects described herein. Said roof assembly is for opening and closing at least one roof opening 1 in a stationary roof part 2 of the vehicle and includes at least one movable closure member, in particular a rigid, transparent panel 3 which, by means not illustrated in detail but known per se, can be moved for opening and closing said roof opening 1. Commonly, as is known, the movable panel 3 is guided in longitudinal guides mounted to or formed in the stationary roof part 2 along longitudinal sides 12 of the roof opening 1. A user operated device such as a motor or crank (not illustrated) is operably coupled to the panel 3 via cables or the like to move the panel 3 selectively between its open and closed positions. In FIG. 1 the closure panel 3 has been illustrated in a position in which it opens the roof opening 1.

A sunshade assembly is positioned below the roof opening 1. Basically, said sunshade assembly comprises a flexible sunscreen 4, a rotatable winding shaft 5 for winding and unwinding the sunscreen 4 at a first transversal trailing edge and two opposite longitudinal guides 6 and 7. The panel guides 6, 7 can be connected to or formed integral from a single unitary body with the guides of the closure panel (not illustrated). Likewise, the guides 6, 7 can be separate from the guides of the panel 3. Drive members may be provided, which in FIG. 1 have been illustrated schematically by dotted lines 9, 10. As is known per se, the drive members 9 may comprise flexible longitudinal members, such as a push and pull cable, driven by an actuator 11 such as an electric motor or hand crank for a reciprocating movement for winding and unwinding the flexible sunscreen 4.

Each drive member 9, 10 is connected to an operating beam 8 provided at a transversal leading edge of the sunscreen 4 remote from the trailing edge. Although the reciprocating movement of the sunscreen 4 primarily is generated by the reciprocating movement of the drive members 9 and 10 as caused by the actuator 11, it is possible too that in addition the winding shaft 5 is preloaded in a sense for winding the sunscreen 4 thereon. Further it should be noted that the movement of the sunscreen 4 also may be initiated manually by engaging the operating beam 8.

Figure 2:
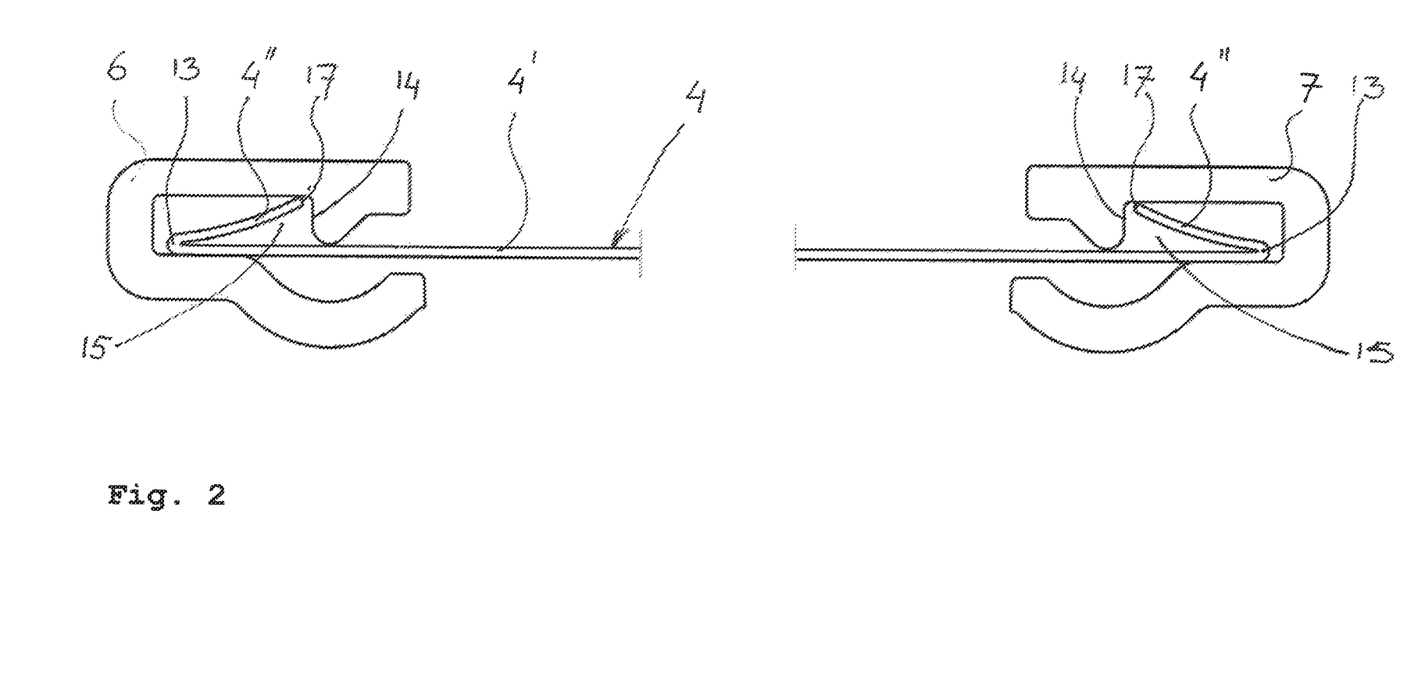
FIG. 2 shows a simplified partial cross section according to the line II-II in FIG. 1.

Now, reference is made to FIG. 2 which schematically shows a cross section according to II-II in FIG. 1 in which only the flexible sunscreen 4 and the longitudinal guides 6,7 have been represented without any details. The flexible sunscreen 4 has a central part 4' and two opposed inwardly folded longitudinal edges 4" connected to the central part by means of folding lines 13. The opposed longitudinal guides 6, 7 for receiving therein and guiding corresponding ones of the inwardly folded longitudinal edges 4" of the flexible sunscreen 4 are provided with locking members 14 for engaging an outer end 17 of the inwardly folded longitudinal edges 4" for preventing these edges from moving out of the longitudinal guides 6, 7. The locking members 14 define a groove 15 in the guides 6, 7 for retaining therein the longitudinal edges 4" to hold the sunscreen taut in the lateral direction. The height of the groove 15 in the guides 6, 7 in which the longitudinal edges 4" are received is smaller than the width of these edges 4" so that it is not possible for the edges 4" to rotate within their grooves 15 if the sunscreen central part 4' exerts a force on the edges 4". The rigidity of the edges 4" in lateral direction is sufficient to reduce their bending during normal use of the sunscreen 4, so that the edges 4" are retained within their grooves 15 in a reliable manner. The lateral edges may be made e.g. from stiffened cloth, plastic tape, a strip, for example from plastic or steel, or combinations thereof. At a position near the winding shaft 5, the inwardly foldable edge 4" is unfolded to a position in extension of the central part 4' in order to be wound. However, it would be possible as an alternative to further fold the edge 4" until positioned flat against the central part 4'.

Figure 3A:
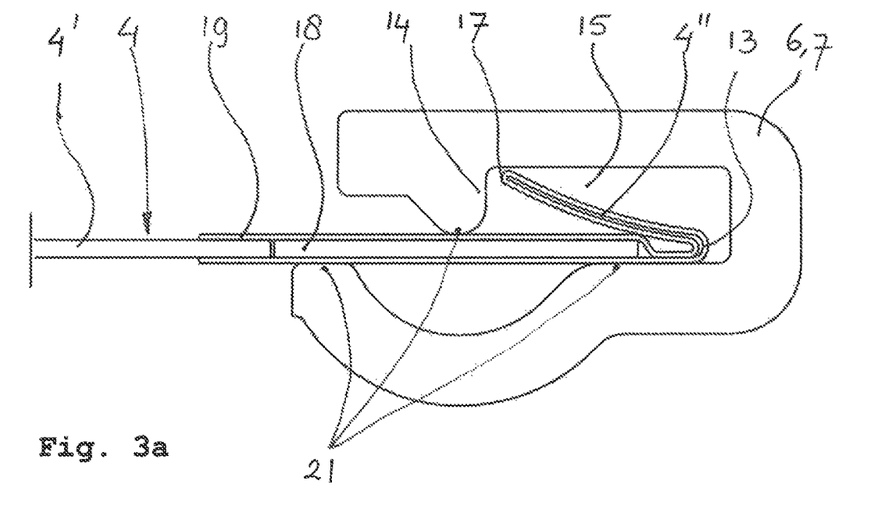
FIG. 3a shows the right portion of FIG. 2 in more detail.
Figure 3B:
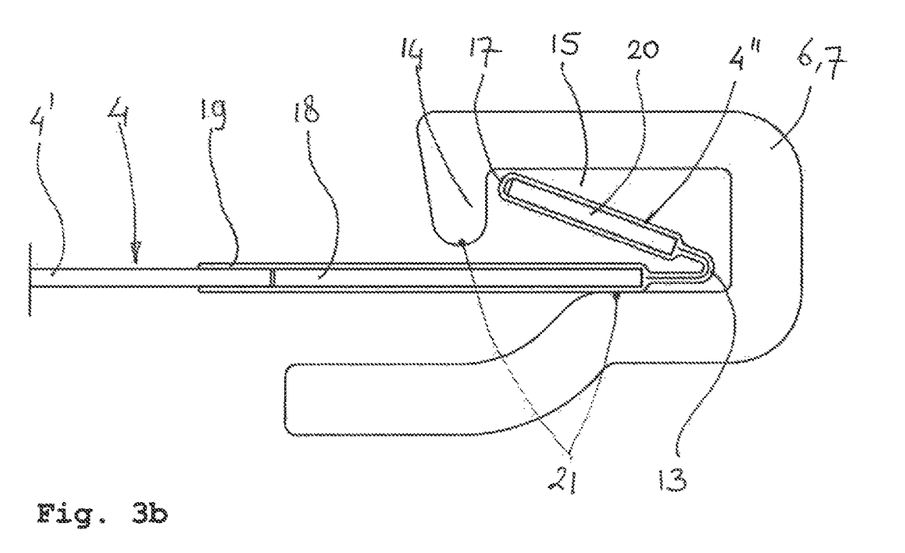
FIGS. 3b, 4 are views similar to that of FIG. 3a, but showing different embodiments of the sunscreen.

FIG. 3a shows an embodiment in which the central part 4', made mainly from cloth-like (elastic) material, is completed by a strip 18 (e.g. steel) positioned next to a longitudinal edge of the cloth-like material and attached to the cloth-like material by means of a plastic tape 19 which is e.g. glued or welded to the cloth-like material, to the strip 18 and to itself or to any insert 20 of the inwardly foldable longitudinal edge 4", as is shown in FIG. 3b.

The strip 18 extends mainly within the guide 6, 7 so as to be invisible for occupants of the vehicle and so as to be guided by the respective guide 6, 7 to support the strip 18 to improve the buckle-resistance thereof and keep it in a straight path following the guide 6, 7. In the embodiment of FIG. 3a, each guide 6, 7 is shaped such that it provides three separated lines of contact (each indicated with a dot 21) to the strip 18, two spaced positions 21 below the strip 18 and one above, which is positioned between the others, particularly centrally between.

In the embodiment of FIG. 3b, each guide 6, 7 provides two lines of contact 21, one positioned above and one below the strip 18 at spaced locations. An even better stability of the guidance of the sunscreen 4 could be obtained if each guide 6, 7 and the strip 18 is arranged in an upside down position, so that FIG. 3b would be mirrored in a vertical direction.

Figure 4:
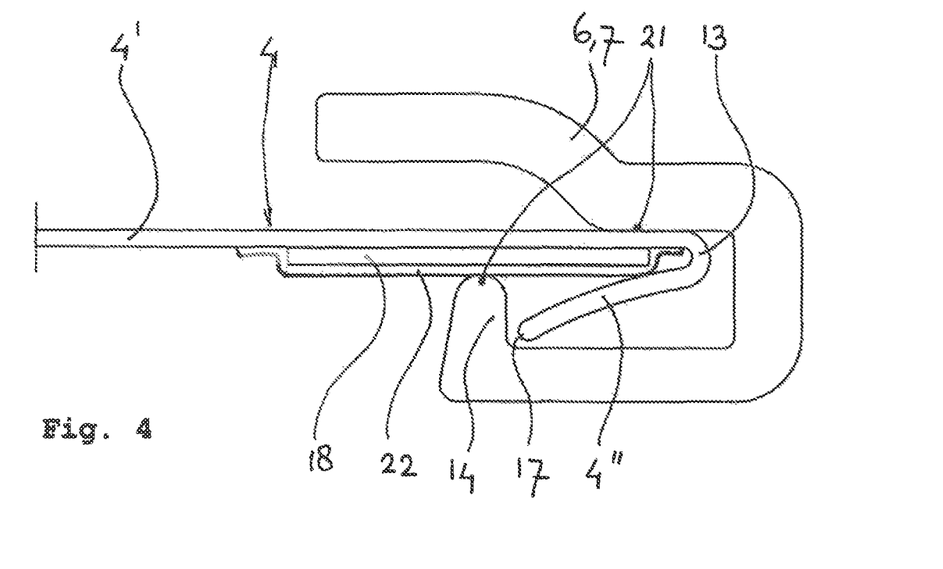

FIG. 4 shows another embodiment in which each strip 18 is positioned on the lower side of the cloth-like material of the central part 4' which is extended into the guides 6, 7 up to or even beyond the folding connection 13. The cloth may be attached, e.g. glued, welded or melted to the strip 18, while the side of the strip 18 facing away from the cloth-like material may be covered by a material 22 having a low coefficient of friction, for example a thin layer of slick cloth or tape the edges of which may be attached to the cloth-like material. The foldable edges 4" may be made from the same cloth-like material as the central part 4' but could be stiffened, for example by impregnation with plastic material, such as polyurethane, that is already present in the cloth-like material, or impregnation with separate plastic material, for example from a thin strip of plastic such as polyester. Such strip could also be maintained as a reinforcement strip attached, e.g. glued, to the edge 4".

The guide 6, 7 in this embodiment is also shaped such as to provide two lines of contact 21 to the area of the sunscreen 4 where the strip 18 is provided. In this embodiment, the inwardly folded longitudinal edge 4" of the sunscreen 4 is actually folded in downward direction, so that the guide 6, 7 is also "upside down". The line of contact 21 below the strip is positioned laterally inwardly of the line of contact 21 above the strip 18. As mentioned, this upside down arrangement offers more stability in case of a guide 6, 7 providing two lines of contact 21. However, all embodiments, including that of FIG. 3a could be used in upside down fashion or not. It is noted that the lines of contact 21 can have a considerable width.

The strip 18, for example spring steel, may be made in a thickness of for example 0.02-0.15 mm. The steel strip may be straight in a relaxed state, or may be spiral-shaped in a relaxed state to assist in winding the sunscreen 4. In the latter case, the steel strip will normally have a thickness in the upper region, e.g. around 0.015 mm, while the straight strip may for example be 0.05 mm in thickness. Of course, it is possible to make the strip 18 from another material (such as but not limited to other metals, plastics and/or other compositions) as long as it has the required properties of stiffness and buckle resistance.

Figure 5:
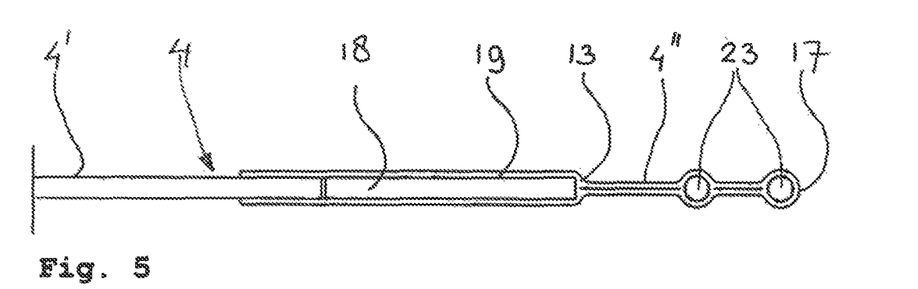
FIG. 5 illustrates a further embodiment of the sunscreen edge, wherein the longitudinal edge is shown in its winding position without the guide.

FIG. 5 shows an embodiment in which the buckle-stiff member is formed by two parallel wires 23, for example, steel wires or thin steel cables, which are provided within the inwardly folded longitudinal edges 4". More or less wires 23 may be provided. In one embodiment, one is at the extreme end 17 of the edge 4" and the other at a distance from it. In the embodiment shown, there is also a strip 18 provided next to the central part 4' of the sunscreen to further improve buckle resistance.

Figure 6:
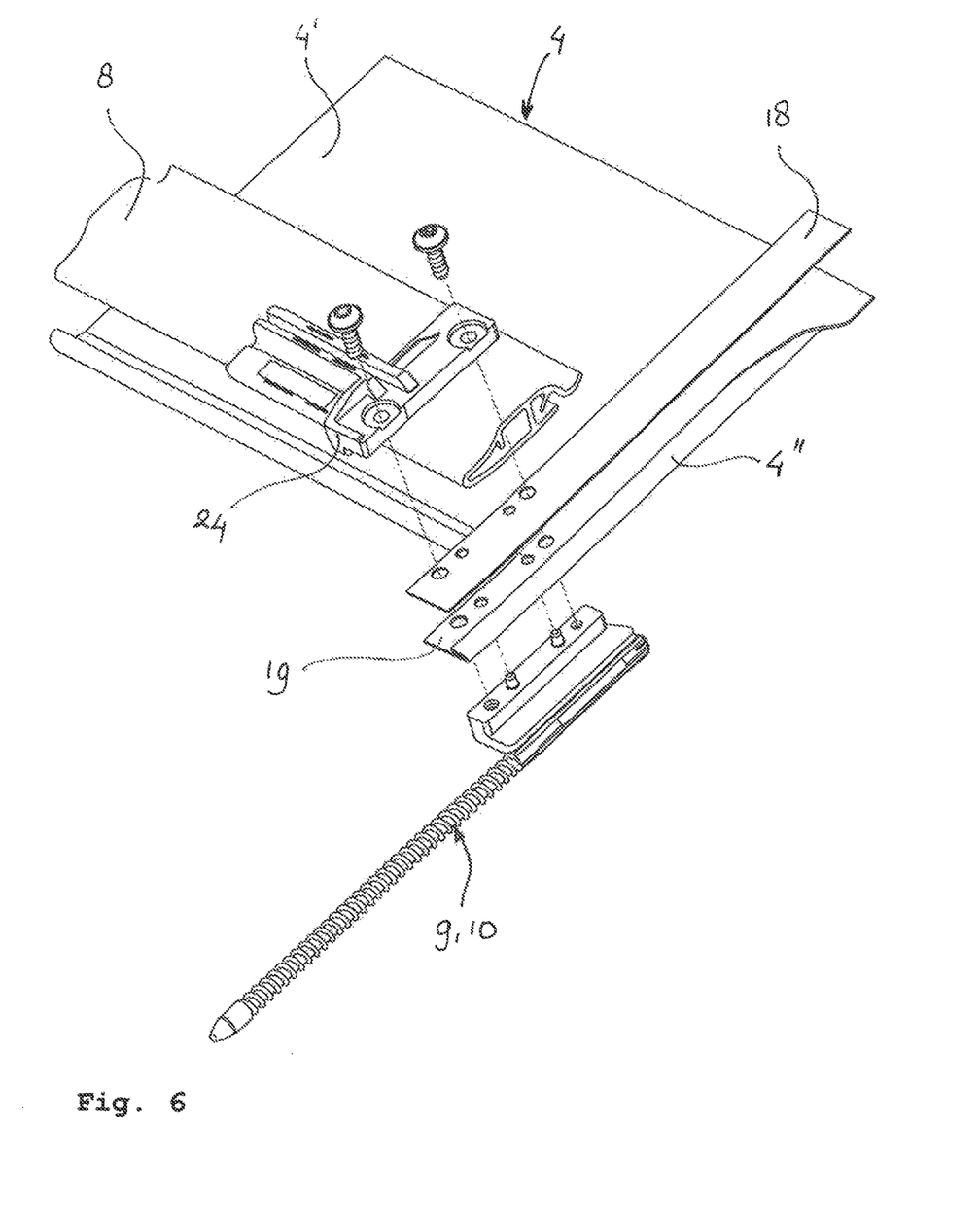
FIG. 6 is a perspective exploded view of the connection between the front beam, sunscreen, buckle-stiff member and drive member.

FIG. 6 shows the attachment of the sunscreen 4 to the operating beam 8. It is clear that the strip 18 (e.g steel), the tape and the adjacent longitudinal edge 4" of the sunscreen 4 are extended beyond the central part 4' of the sunscreen and the steel strip 18 is fixedly clamped by a clamping member 24 in a sandwich construction to an end part of the drive member 9, 10 (here a push and pull cable) along a sufficient length so that push forces from the drive member 9, 10 can be reliably guided into the steel strip 18. No pilot is required. The beam 8 is attached to the front of the sunscreen 4 and/or to the clamping members 24. In case the sunscreen is manually adjustable, the strips 18 will be attached to the beam 8 to transmit forces from the beam 8 to the sunscreen 4. The attachment of the strip 18 is effected here by fitting pins and screws, but all kinds of other arrangements are conceivable.

In other embodiments (not illustrated) the following features may be incorporated: when the longitudinal edges 4" comprise a core surrounded by a separate layer of for example tape, the core may have a reduced thickness such that the overall thickness of the edges 4" is substantially the same as the thickness of the central part 4' of the flexible sunscreen 4; this may apply too to parts of the central part 4' close to the folding lines 13; a separate layer 16 surrounding the edge 4" and extending over and beyond the folding line 13 may be provided with openings coinciding with the folding line 13; a folding line 13 may be replaced by a hinge.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A sunshade assembly, in particular for use in a vehicle roof assembly, comprising:
    a flexible sunscreen having at least a central part, two opposed inwardly folded longitudinal edges connected to the central part by means of folding lines, a leading edge and a trailing edge,
    a winding shaft configured to wind and unwind the flexible sunscreen at its trailing edge,
    an operating beam attached to the leading edge, and
    two opposed longitudinal guides configured to therein and guiding corresponding ones of the inwardly folded longitudinal edges of the flexible sunscreen, which guides are provided with locking members configured to engage an outer end of the inwardly folded longitudinal edges for preventing these edges from moving out of the longitudinal guides when the sunscreen is at least partly unwound,
    wherein the flexible sunscreen is provided with at least two members which are each arranged substantially parallel to a respective longitudinal edge of said sunscreen and which are buckle-stiff in a direction parallel to said longitudinal edge, said buckle-stiff members extend at least partly within and preferably being guided by said longitudinal guides along the whole length from the operating beam to the winding shaft in the fully unwound condition of the sunscreen, and wherein the buckle-stiff members are strips provided in the central part of the sunscreen.

2. The sunshade assembly of claim 1, wherein the strips are made of metal having a thickness of 0.05-0.15 mm.

3. The sunshade assembly of claim 1, wherein the central part of the sunscreen is made of cloth-like material, the strip being positioned next to an edge of the cloth-like material and attached to the cloth-like material by a connecting member covering at least one side of the strip and an adjacent portion of the cloth-like material.

4. The sunshade assembly of claim 3, wherein the connecting member covers both sides of the strip, the inwardly foldable longitudinal edge and the adjacent portion of the cloth-like material.

5. The sunshade assembly of claim 3, wherein the connecting member is a self-adhesive tape or a woven or non-woven cloth attached to the strip and the material of the central part of the sunscreen.

6. The sunshade assembly of claim 1, wherein each strip is attached on a side of the central part of the sunscreen.

7. The sunshade assembly of claim 1, wherein each strip is guided by the respective guide.

8. The sunshade assembly of claim 7, wherein each guide is shaped such that each area of the strip contacts the guide at least at two separated positions, one above and one below the strip.

9. The sunshade assembly of claim 8, wherein each guide is shaped such that each area of the strip contacts the guide at three separated positions, two on one side of the strip and one on the other.

10. The sunshade assembly of claim 1, wherein the buckle-stiff members are biased towards a spiral shape.

11. A sunshade assembly, in particular for use in a vehicle roof assembly, comprising:
    a flexible sunscreen having at least a central part, two opposed inwardly folded longitudinal edges connected to the central part by means of folding lines, a leading edge and a trailing edge,
    a winding shaft configured to wind and unwind the flexible sunscreen at its trailing edge,
    an operating beam attached to the leading edge; and
    two opposed longitudinal guides configured to therein and guiding corresponding ones of the inwardly folded longitudinal edges of the flexible sunscreen, which guides are provided with locking members configured to engage an outer end of the inwardly folded longitudinal edges for preventing these edges from moving out of the longitudinal guides when the sunscreen is at least partly unwound;

wherein the flexible sunscreen is provided with at least two buckle-stiff members which are each arranged substantially parallel to a respective longitudinal edge of said sunscreen and which are buckle-stiff in a direction parallel to said longitudinal edge, said buckle-stiff members extend at least partly within and preferably being guided by said longitudinal guides along the whole length from the operating beam to the winding shaft in the fully unwound condition of the sunscreen, and wherein the inwardly foldable longitudinal edges each comprise at least two integrated, substantially parallel buckle-stiff wires forming the buckle-stiff members.

12. The sunshade assembly of claim 11, wherein said wires are provided at the inwardly foldable longitudinal edges.

13. A sunshade assembly, in particular for use in a vehicle roof assembly, comprising:
   a flexible sunscreen having at least a central part, two opposed inwardly foldable longitudinal edges connected to the central part by means of folding lines, a leading edge and a trailing edge,
   a winding shaft configured to wind and unwind the flexible sunscreen at its trailing edge,
   an operating beam attached to the leading edge, and
   two opposed longitudinal guides configured to retain therein and guide corresponding ones of the inwardly folded longitudinal edges of the flexible sunscreen, which guides are provided with locking members configured to engage an outer end of the inwardly folded longitudinal edges to inhibit these edges from moving out of the longitudinal guides when the sunscreen is at least partly unwound,
   wherein the central part of the flexible sunscreen is provided with at least two strips which are each arranged substantially parallel to a respective longitudinal edge of said sunscreen and which are buckle-stiff in a direction parallel to said longitudinal edge, each strip extending at least partly within and being guided by said longitudinal guide along the whole length from the operating beam to the winding shaft in the fully unwound condition of the sunscreen.

14. The sunshade assembly of claim 13, wherein the strips are made of metal having a thickness of 0.05-0.15 mm.

15. The sunshade assembly of claim 13, wherein the central part of the sunscreen is made of cloth-like material, each strip being positioned next to an edge of the cloth-like material and attached to the cloth-like material by means of a connecting member attached to the strip and the material of the central part of the sunscreen.

16. The sunshade assembly of claim 15, wherein the connecting member covers both sides of the strip, the inwardly foldable longitudinal edge and the adjacent portion of the cloth-like material.

17. The sunshade assembly of claim 13, wherein each strip is attached on a side of the central part of the sunscreen.

18. The sunshade assembly of claim 13, wherein each strip is guided by the respective guide, and wherein each guide is shaped such that each area of the strip contacts the guide at least at two separated positions, one above and one below the strip.

19. The sunshade assembly of claim 13, wherein each strip is guided by the respective guide, and wherein each guide is shaped such that each area of the strip configured to contact the guide at three separated positions, two on one side of the strip and one on the other.

20. An open roof construction for a stationary roof part of a vehicle comprising:
   a movable closure member configured to mount to the stationary roof part and open and close an opening in the stationary roof part, and
   a sunshade assembly configured to be mounted below the movable closure member, the sunshade assembly comprising:
   a flexible sunscreen having at least a central part, two opposed inwardly folded longitudinal edges connected to the central part by means of folding lines, a leading edge and a trailing edge,
   a winding shaft configured to wind and unwind the flexible sunscreen at its trailing edge, an operating beam attached to the leading edge, and
   two opposed longitudinal guides configured to therein and guiding corresponding ones of the inwardly folded longitudinal edges of the flexible sunscreen, which guides are provided with locking members configured to engage an outer end of the inwardly folded longitudinal edges for preventing these edges from moving out of the longitudinal guides when the sunscreen is at least partly unwound,
   wherein flexible sunscreen is provided with at least two members which are each arranged substantially parallel to a respective longitudinal edge of said sunscreen and which are buckle-stiff in a direction parallel to said longitudinal edge, said buckle-stiff members extend at least partly within and preferably being guided by said longitudinal guides along the whole length from the operating beam to the winding shaft in the fully unwound condition of the sunscreen, and wherein the buckle-stiff members are strips provided in the central part of the sunscreen.

* * * * *